United States Patent
Lu et al.

(10) Patent No.: US 11,261,293 B2
(45) Date of Patent: Mar. 1, 2022

(54) RESORBABLE POLYMER PURIFICATION PROCESS

(71) Applicant: Evonik Corporation, Parsippany, NJ (US)

(72) Inventors: Jie Lu, Norwalk, CT (US); Boris Obermeier, Hattersheim (DE); Regina Arnold-Stanton, Vestavia Hills, AL (US); Adolphus G. Jones, Hoover, AL (US)

(73) Assignee: Evonik Corporation, Parsippany, NJ (US)

( * ) Notice: Subject to any disclaimer, the term of this patent is extended or adjusted under 35 U.S.C. 154(b) by 0 days.

(21) Appl. No.: 16/643,375

(22) PCT Filed: Aug. 31, 2018

(86) PCT No.: PCT/US2018/049140
§ 371 (c)(1),
(2) Date: Feb. 28, 2020

(87) PCT Pub. No.: WO2019/046748
PCT Pub. Date: Mar. 7, 2019

(65) Prior Publication Data
US 2020/0190258 A1    Jun. 18, 2020

Related U.S. Application Data

(60) Provisional application No. 62/552,973, filed on Aug. 31, 2017.

(51) Int. Cl.
| | |
|---|---|
| *C08G 63/08* | (2006.01) |
| *C08G 63/90* | (2006.01) |
| *C08G 63/85* | (2006.01) |
| *C08K 3/04* | (2006.01) |
| *C08K 5/09* | (2006.01) |

(52) U.S. Cl.
CPC ............. *C08G 63/90* (2013.01); *C08G 63/08* (2013.01); *C08G 63/85* (2013.01); *C08K 3/04* (2013.01); *C08K 5/09* (2013.01)

(58) Field of Classification Search
USPC ........ 528/190, 193, 194, 271, 272, 274, 486
See application file for complete search history.

(56) References Cited

U.S. PATENT DOCUMENTS 4,810,775 A * 3/1989 Bendix .................. A61L 27/18
                                                                    210/768
6,353,030 B1    3/2002 Prikoszovich

FOREIGN PATENT DOCUMENTS

| EP | 0469520 A2 | 2/1992 |
| EP | 1310517 A1 | 5/2003 |
| EP | 2039714 A1 | 3/2009 |
| WO | 200043435 A1 | 7/2000 |

OTHER PUBLICATIONS

Yang, Y. et al. Synthesis and Characterization of Terpolymers of poly(L-lactide-glycolide-ε-caprolactone), Journal of Macromolecular Science, Part B, 57:8, 562-571, 2018 (Year: 2018).*
PCT International Search Report and The Written Opinion of the International Searching Authority dated Dec. 19, 2018 corresponding to PCT Application No. PCT/US2018/049140 filed Aug. 31, 2018 (14 pages).

* cited by examiner

*Primary Examiner* — Terressa Boykin
(74) *Attorney, Agent, or Firm* — Linda S. Li; Andrew H. Chung; Jason S. Ngui

(57) ABSTRACT

The present invention is directed to an improved purification process using additive and activated carbon for purifying resorbable polymers suitable for industrial manufacturing. The metal catalyst concentration in the purified resorbable polymers of this invention is preferably less than 1 ppm. The method can be used to obtain high molecular weight polymers that are substantially metal free.

13 Claims, 1 Drawing Sheet

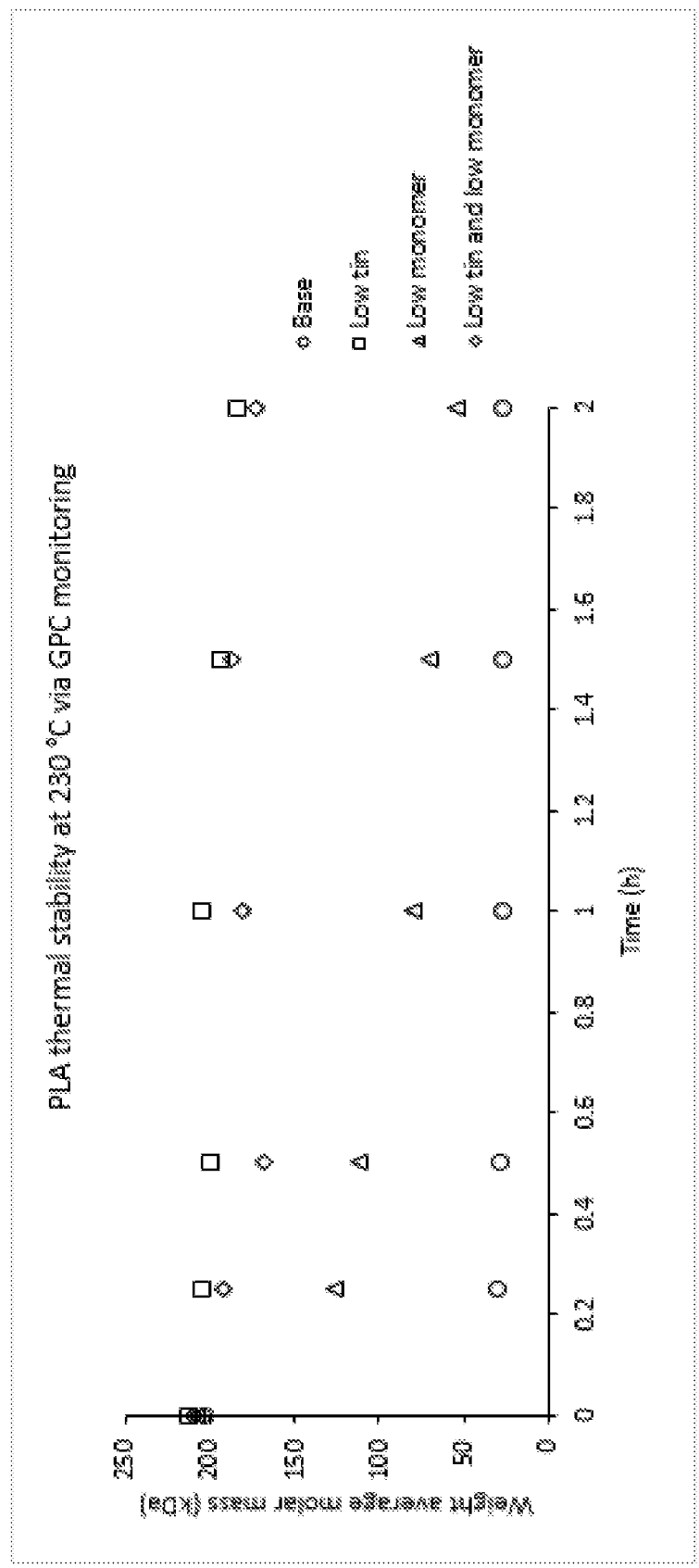

RESORBABLE POLYMER PURIFICATION PROCESS

This Application is a 35 U.S.C. § 371 U.S. national stage of PCT International Application No. PCT/US18/49140, filed Aug. 31, 2018, which claims the benefit of U.S. Provisional Patent Application No. 62/552,973, filed Aug. 31, 2017, the contents of each of which are hereby incorporated by reference in their entirety into this application.

FIELD OF INVENTION

The present invention relates to an improved purification process for resorbable polymers suitable for industrial manufacturing. The metal catalyst concentration in the resorbable polymer of this invention is preferably less than 1 ppm. The method can be used to obtain high molecular weight polymers that are substantially metal free.

BACKGROUND OF THE INVENTION

Biodegradable polymers have been pursued as environmentally friendly polymers. Advances in the synthesis, manufacturing and processing of these materials during the past 30 years promote their practical applications from packaging to more sophisticated biomedical devices. Aliphatic polyesters are a particularly attractive class of biodegradable polymers, especially those derived from lactic acid and glycolic acid. Such aliphatic polyesters are not only biodegradable, but also bioresorbable. In physiological systems, the polymer residues will eventually be eliminated or metabolized by natural pathways (H. K. Makadia et al *Polymers*, 2011, 3, 1377).

Bioresorbable polyesters, e.g. polylactides, poly(lactide-co-glycolide)s, poly(lactide-co-caprolactone)s, are preferably used as matrices for controlled drug release. The form of these matrices are as microparticles from emulsion processes or implants from extrusion processes. Pharmaceutical applications of bioresorbable polyesters strongly depend on the polymer properties. The chemical composition, polymer chain length, end group, architecture and microstructure, and purity determine the chemical and physical polymer properties. Advanced polymerization techniques enable tailored polymer design via various synthetic routes.

Metal-free routes to prepare such bioresorbable polyesters include 1) polycondensation of suitable hydroxyl carboxylic acid, 2) strong acid ion exchanger catalyzed ring-opening polymerization of lactide and glycolide and 3) organo-catalyzed ring-opening polymerization, e.g. dimethylaminopyridine. (DMAP) Both polycondensation and acid catalyzed ring-opening polymerization methods are limited to produce low molecular weight polymers, 21 kDa (EP171907) and 35 kDa (EP26599) respectively. Metal-free polylactides obtained from ring-opening polymerization using organo-catalyst can achieve high monomer conversions in a few minutes (O. Dechy-Cabaret et al, *Chem. Rev.* 2004, 104, 6147). However, industrial application of this synthetic route is limited by the high catalyst loading and the lack of monomer sequence length control.

Various metal catalytic systems are capable to support polyester preparation. Tin and zinc compounds are particularly favored in polyester synthesis. Metal-catalyzed ring-opening polymerization of lactide, and optionally glycolide and/or caprolactone, is widely considered a standard route for high molecular weight polyester synthesis. Polyesters produced by metal catalyzed ring-opening polymerization will contain unreacted monomers, catalyst, solvents, and trace amounts of other impurities. In pharmaceutical applications, these impurities must be rigorously controlled to limit the toxicological impact. The FDA (Food and Drug Administration) has set a limit of 20 ppm of residual tin in commercially used medical polymers. (A. Stjerndahl et al *Biomacromolecules* 2007, 8, 937)

Metal catalyst residue stays in the human body after polymer resorption. Depending on the metal's identity, surrounding tissue may be subject to intoxication, irritation, or inflammation. In pharmaceutical formulations, metal residues can also react with sensitive active pharmaceutical ingredients (API) to promote degradation and loss of efficacy. The pathways observed are transesterification reactions or uncontrolled polymer degradation. These degradation processes change the drug release profile from the pharmaceutical formulation. For polymer implants, residual metal catalyst was identified as the most influential factor causing polymer degradation during melt processing.

Various purification processes are known to remove tin catalyst from polyester. These methods are not limited by the polymer molecular weight. Existing purification processes established in prior art, academic literature and patents include (1) extraction by strong acid; (2) use of metal scavenger agents; (3) absorption onto activated carbon followed by ultrafiltration. In EP0270987 A2, polylactides are purified by dissolving the polymer in a water immiscible solvent, i.e. dichloromethane (DCM) or chloroform ($CHCl_3$) then washing the solution with an aqueous solution of hydrochloric acid (HCl) or ethylenediamine tetra-acetic acid (EDTA). The method requires the use of large amounts of chlorinated solvent, a carcinogenic chemical that is avoided in industrial practice or is not tolerated in resorbable polymers. The resulting purified polymer from this method still contains a residual amount of metal, ca. 2 ppm. In U.S. Pat. No. 6,353,030 B1, polylactides are purified by dissolving the polymer in organic solvent, i.e. acetone, and treating the solution with an amount of activated carbon equal to the weight of the polymer. The purified polymer containing 1 to 1.5 ppm residual metal was obtained after solvent precipitation and vacuum drying. However, the large amount of activated carbon not only creates a high volume of chemical waste but also lowers the recovered polymer yield.

It is postulated that the acidic groups in the activated carbon are responsible for the absorption of metal species. For this reason, lactic acid was introduced as an auxiliary to increase the metal removal efficiency of activated carbon. Surprisingly, we observed that a combination of lactic acid and activated carbon improves the purification performance when compared to purification by activated carbon only. The improved purification process of this invention utilizes a reduced amount of activated carbon with lactic acid additive to achieve improved tin removal. For linear polyester polymers with standard levels of residual tin, e.g. 80-200 ppm, the amount of activated carbon is reduced from 25-200 wt. % of polymer to 1-5 wt. % by using a small amount of lactic acid as an additive. Use of lactic acid as an additive to activated carbon lowers the amount of carbon necessary, and avoids costly separation or filtration processes. This method minimizes the risk of polymer degradation due to acid washing.

SUMMARY OF THE INVENTION

In one aspect, disclosed is a method of reducing the residual tin content in a tin containing resorbable polymer to less than 1 ppm by: dissolving a polymer in an organic solvent to produce a polymer solution; combining the polymer solution with activated carbon and an additive; wherein said method results in the formation of a purified polymer; and recovery of the purified polymer by anti-solvent precipitation.

In another aspect, disclosed is a purified polyester which is a branched or a linear poly(lactide-co-glycolide) having a weight-average molecular weight of 5 to 315 kDa, a polydispersity (Mw/Mn) of 1.5 to 2.5, prepared by the process of ring-opening polymerization of lactide and glycolide in the presence of tin (II)-(2-ethylhexanoate) or tin chloride followed by treatment with activated carbon and an additive.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF DRAWINGS

The above and other objects, features and advantages of the present invention will be more clearly understood from the following detailed description taken in conjunction with the accompanying drawings, in which:

Fig. 1 is a graph showing the individual parameter effect on PLA thermal stability.

DETAILED DESCRIPTION OF THE INVENTION

Before the present resorbable polymers and processes are disclosed and described, it is to be understood that the aspects described herein are not limited to specific processes, compounds, synthetic methods, articles, devices, or uses as such can, of course, vary. It is also to be understood that the terminology used herein is for the purpose of describing particular aspects only and, unless specifically defined herein, is not intended to be limiting.

Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The term "wt. %" means weight percent.

The term "resorbable polymer" as used herein refers to a polymer that is degradable and the small molecule components are absorbed into the body.

The term "biocompatible" as used herein refers to a material that is generally non-toxic to the recipient and does not possess any significant untoward effects to the subject and, further, that any metabolites or degradation products of the material are non-toxic to the subject. Typically a substance that is "biocompatible" causes no clinically relevant tissue irritation, injury, toxic reaction, or immunological reaction to living tissue.

The term "biodegradable" as used herein refers to a material that will erode to soluble species or that will degrade under physiologic conditions to smaller units or chemical species that are, themselves, non-toxic (biocompatible) to the subject and capable of being metabolized, eliminated, or excreted by the subject.

The term "anti-solvent precipitation" is the recovery of a solid, in this case polymer, from a solution by intimate mixing with a second solvent. The second solvent is chosen to force the desired solid to nucleate and precipitate from the solution. Any impurities remain dissolved in the mixture of the two solvents, and the precipitated solid is recovered and transferred for drying operations.

The existing process to remove catalyst from resorbable polymers requires large amounts of activated carbon and leads to low yields. Such processes are difficult to optimize and make cost-effective for industrial scale products. Incorporating the "prevention" principles of "green chemistry" (Green Chemistry: Theory and Practice, Paul T. Anastas and John C. Warner), the present invention provides an improved method to purify resorbable polymers using a significantly reduced amount of activated carbon with a small amount of acid additive as auxiliary.

Resorbable polymers can include but are not limited to biodegradable polymers, biocompatible polymers, or resorbable polyesters.

Resorbable polymers can include but are not limited to poly(lactide), a poly(glycolide), a poly(lactide-co-glycolide), a poly(caprolactone), a poly(orthoester), a poly(hydroxybutyrate) or a copolymer containing a poly(hydroxybutyrate), a poly(lactide-co-caprolactone), a polycarbonate, a polyesteramide, a polyanhydride, a poly(dioxanone).

Resorbable polyesters can include, but are not limited to, poly(lactide), a poly(glycolide), a poly(lactide-co-glycolide), a poly(caprolactone), a poly(orthoester), a poly(hydroxybutyrate) or a copolymer containing a poly(hydroxybutyrate), a poly(lactide-co-caprolactone).

A variety of biocompatible polymers can be used in the methods disclosed herein. In one aspect, the biocompatible polymer can also be a biodegradable polymer. In another aspect, the biocompatible polymer can also be a biodegradable polymer. For example, the biocompatible polymer can be one or more of polyesters, polyhydroxyalkanoates, polyhydroxybutyrates, polydioxanones, polyhydroxyvalerates, polyanhydrides, polyorthoesters, polyphosphazenes, polyphosphates, polyphosphoesters, polydioxanones, polyphosphoesters, polyphosphates, polyphosphonates, polyphosphates, polyhydroxyalkanoates, polycarbonates, polyalkylcarbonates, polyorthocarbonates, polyesteramides, polyamides, polyamines, polypeptides, polyurethanes, polyalkylene alkylates, polyalkylene oxalates, polyalkylene succinates, polyhydroxy fatty acids, polyacetals, polycyanoacrylates, polyketals, polyetheresters, polyethers, polyalkylene glycols, polyalkylene oxides, polyethylene glycols, polyethylene oxides, polypeptides, polysaccharides, or polyvinyl pyrrolidones. Other non-biodegradable but durable and biocompatible polymers include without limitation ethylene-vinyl acetate co-polymer, polytetrafluoroethylene, polypropylene, polyethylene, and the like. Likewise, other suitable non-biodegradable polymers include without limitation silicones and polyurethanes.

The biocompatible and/or biodegradable polymer can be a poly(lactide), a poly(glycolide), a poly(lactide-co-glycolide), a poly(caprolactone), a poly(orthoester), a poly(phosphazene), a poly(hydroxybutyrate) or a copolymer containing a poly(hydroxybutyrate), a poly(lactide-co-caprolactone), a polycarbonate, a polyesteramide, a polyanhydride, a poly(dioxanone), a poly(alkylene alkylate), a copolymer of polyethylene glycol and a polyorthoester, a biodegradable polyurethane, a poly(amino acid), a polyamide, a polyesteramide, a polyetherester, a polyacetal, a polycyanoacrylate, a poly(oxyethylene)/poly(oxypropylene) copolymer, polyacetals, polyketals, polyphosphoesters, polyhydroxyvalerates or a copolymer containing a polyhydroxyvalerate, polyalkylene oxalates, polyalkylene succinates, poly(maleic acid), and copolymers, terpolymers, combinations, or blends thereof.

The biocompatible or biodegradable polymer can comprise any lactide residue, including all racemic and stereospecific forms of lactide, including, but not limited to, L-lactide, D-lactide, and D,L-lactide, or a mixture thereof. Useful polymers comprising lactide include, but are not limited to poly(L-lactide), poly(D-lactide), and poly(DL-lactide); and poly(lactide-co-glycolide), including poly(L-lactide-co-glycolide), poly(D-lactide-co-glycolide), and poly(DL-lactide-co-glycolide); or copolymers, terpolymers, combinations, or blends thereof. Lactide/glycolide polymers can be conveniently made by melt polymerization through ring opening of lactide and glycolide monomers. Additionally, racemic DL-lactide, L-lactide, and D-lactide polymers are commercially available. The L-polymers are more crystalline and resorb slower than DL-polymers. In addition to copolymers comprising glycolide and DL-lactide or L-lactide, copolymers of L-lactide and DL-lactide are commercially available. Homopolymers of lactide or glycolide are also commercially available.

When the biodegradable and/or biocompatible polymer is poly(lactide-co-glycolide), poly(lactide), or poly(glycolide), the amount of lactide and glycolide in the polymer can vary. In a further aspect, the biodegradable polymer contains 0 to 100 mole %, 40 to 100 mole %, 50 to 100 mole %, 60 to 100 mole %, 70 to 100 mole %, or 80 to 100 mole % lactide and from 0 to 100 mole %, 0 to 60 mole %, 10 to 40 mole %, 20 to 40 mole %, or 30 to 40 mole % glycolide, wherein the amount of lactide and glycolide is 100 mole %. In a further aspect, the biodegradable polymer can be poly(lactide), 95:5 poly(lactide-co-glycolide) 85:15 poly(lactide-co-glycolide), 75:25 poly(lactide-co-glycolide), 65:35 poly(lactide-co-glycolide), or 50:50 poly(lactide-co-glycolide), where the ratios are mole ratios The biodegradable and/or biocompatible polymer can also be a poly(caprolactone) or a poly(lactide-co-caprolactone). The polymer can be a poly(lactide-caprolactone), which, in various aspects, can be 95:5 poly(lactide-co-caprolactone), 85:15 poly(lactide-co-caprolactone), 75:25 poly(lactide-co-caprolactone), 65:35 poly(lactide-co-caprolactone), or 50:50 poly(lactide-co-caprolactone), where the ratios are mole ratios.

The metal catalyst concentration in the purified resorbable polymer of this invention is preferably less than 1 ppm.

In one aspect, metal-catalyzed ring-opening polymerization of one or more monomers of lactide, glycolide, caprolactone, is performed in the presence of an initiator with at least one hydroxyl group.

Exemplary initiators for the ring opening polymerization include, but are not limited to, simple alcohols, diols, and α-hydroxy organic acids. Other exemplary initiators include, but are not limited to, lactic acid, glycolic acid, and alcohols.

The molar ratio of monomer/initiator controls the chain length of the resorbable polymer. Smaller amounts of initiating hydroxyl species lead to longer chains, greater amounts to shorter chains. The type of initiator also determines the polymer structure, linear or branched.

In one aspect, when the polymer is linear the additive is up to 20 wt % of the solvent, preferably up to 5 wt % of the solvent, more preferably up to 1 wt %, or most preferably up to 0.5 wt %.

In one aspect, when the polymer is linear the activated carbon is up to 9 wt % of the linear polymer, preferably up to 7 wt % of the linear polymer, or more preferably up to 5 wt % of the linear polymer.

In one aspect, when the polymer is branched the additive is up to 20 wt % of the solvent, preferably up to 5 wt % of the solvent, more preferably up to 1 wt %, or most preferably up to 0.5 wt %.

In one aspect, when the polymer is branched the activated carbon is between 50 to 100 wt % of the branched polymer, preferably up to 60 to 90 wt % of the branched polymer, or more preferably up to 70 to 80 wt % of the branched polymer.

The monomer molar ratio of the lactide/glycolide units are preferably 100-25/0-75, more preferably 100-50/0-50. In one aspect, the monomer ratio of lactide/caprolactone units are preferably 100-10/0-90. In one aspect, terpolymers of lactide, glycolide and caprolactone are also covered in this invention. In one aspect, the residual monomer, e.g. lactide, glycolide, caprolactone, in the purified polymer is preferably at most 0.5 wt %, particularly 0.1 wt % for glycolide.

In one aspect, the concentration of $Sn^{2+}$ in the purified resorbable polymer of this invention is preferably 1 ppm or less; the catalyst anion is preferably 2-ethyl hexanoate or chloride, which is in a concentration of at most 0.5 wt %.

In one aspect, the purification process of the invention is applicable to resorbable polymer produced by ring opening polymerization using $Sn^{2+}$ as a catalyst.

The polymers have preferably an average molecular weight $M_w$ of 5 to 315 kDa, especially of 10 to 200 kDa, and preferably have a $M_w/M_n$ from 1.2 to 2.5.

The molecular weight $M_w$ is determined by gel permeation chromatography, using polystyrene standards, Agilent PLgel columns with chloroform as the mobile phase and a refractive index detector.

In one aspect, the purification process disclosed in this invention is obtained by contacting a solution of the linear resorbable polymer with a reduced amount of activated carbon and a small amount of additive, e.g. lactic acid. The activated carbon is removed from the solution of polymer in acetone. The purified resorbable polymer is then recovered from solution through anti-solvent precipitation.

In one aspect, the polymer is dissolved completely in an appropriate solvent at a weight percent from 5 to 30 wt %. The activated carbon and lactic acid are added to the polymer solution. The suspension is stirred from 2 to 5 hours, more preferably 3 to 4 hours. The purified polymer solution is separated from the activated carbon solid. Methods for separation by filtration are most preferred. The purified polymer is recovered as a solid by anti-solvent precipitation.

Non-purified polymer containing up to 600 ppm of $Sn^{2+}$ can be employed in the process of this invention. Purified polymers are obtained with $Sn^{2+}$ content from 200 ppb up to 1 ppm. The solvent used in this process is preferably acetone although other solvents are possible.

Determination of the tin amount was achieved by inductively coupled plasma-mass spectroscopy (ICP-MS). The sample was digested by a mixture of concentrated hydrochloric acid and concentrated nitric acid in a sealed microwave system. A portion of the digestate was dissolved in water and injected into the spectrometer. This method follows the guidelines set forth in General Chapter <730> Plasma Spectrochemistry of the current USP.

<1> A method of reducing the residual tin content in a tin containing resorbable polymer to less than 1 ppm, comprising:
  (a) dissolving a polymer in an organic solvent to produce a polymer solution;
  (b) combining the polymer solution with activated carbon and an additive; wherein said method results in the formation of a purified polymer; and
  (c) recovering the purified polymer by anti-solvent precipitation.

<2> The method of aspect <1>, wherein the polymer is linear.

<3> The method of aspect <2>, wherein the additive is up to 20 wt % of the solvent, and activated carbon is up to 9 wt % of the linear polymer.

<4> The method of aspect <1>, wherein the polymer is branched.

<5> The method of aspect <4>, wherein the additive is up to 20 wt % of the solvent, and activated carbon is between 50-100 wt % of the branched polymer.

<6> The method of aspect <1>, wherein the additive and activated carbon is exposed to the polymer solution for 2 to 4 hours <7> The method of aspect <1>, wherein the additive is lactic acid, glycolic acid, or water.

<8> A purified polyester which is a branched or a linear polylactide-glycolide having a weight averaged molecular weight of 5 to 315 kDa, a polydispersity $M_w/M_n$ of 1.5 to 2.5, prepared by the process of ring-opening polymerization of lactide and glycolide in the presence of tin (II)-(2-ethylhexanoate) or tin chloride followed by treatment with activated carbon and an additive.

<9> The purified polyester of aspect <8>, wherein the additive is lactic acid, glycolic acid, or water.

<10> The purified polyester of aspect <8> having a D,L-lactide/glycolide molar ratio of 100-50/0-50.

<11> The purified polyester of aspect <8> having a D,L-lactide/caprolactone molar ratio of 100-90/0-10.

<12> The purified polyester of aspect <8> having a terpolymer of lactide, glycolide, and caprolactone.

<13> The purified polyester of aspect <8>, wherein the purified polyester is poly(D,L-lactide),
  poly(D,L-lactide-co-glycolide) with more than 50 mole % D,L-lactide content,
  poly(D,L-lactide-co-caprolactone) with more than 10 mole % D,L-lactide content,
  poly(L-lactide-co-caprolactone) with more than 50 mole % L-lactide content,
  poly(D,L-lactide-co-trimethylene carbonate) with more than 50 mole % D,L-lactide content,
  poly(D,L-lactide-co-dioxanone) with more than 50 mole % D,L-lactide content, or
  poly(D,L-lactide-co-glycolide-co-caprolactone) with less than 50 mole % glycolide content.

<14> The purified polyester of aspect <8> having an acid number comparable to standard polylactide.

<15> The purified polyester of aspect <8> having improved thermal stability compared to standard polylactide.

EXAMPLES

The following examples are provided to illustrate the purification process of the invention. They are intended solely as possible methods described by way of examples without limiting the invention to their contents.

Example 1: 75:25 Poly(D,L-Lactide-Co-Glycolide) (RESOMER® Select 7525 DLG 7E)

D,L-lactide and glycolide were polymerized in bulk catalyzed by tin 2-ethyl hexanoate and initiated by alcohol. The resulting poly(D,L-lactide-co-glycolide) with ester end group was characterized to have an averaged molecular weight ($M_w$) of 121 kDa, $M_w/M_n$ of 1.6 by GPC, and residual tin content 90 ppm.

25 g of this polymer was dissolved in acetone to yield a 9-10 wt % solution. Activated carbon was added to absorb the residual $Sn^{2+}$ in the polymer. The resulting suspension was stirred for 4 hours, filtered to remove activated carbon, followed by recovery of the purified polymer solid by anti-solvent precipitation with water. Different amounts of activated carbon used in the process yielded different residual $Sn^{2+}$ content after separation and recovery, as shown in Table 1.

In entry 1-5, use of excess amounts of activated carbon was necessary to reach less than 1 ppm residual tin. The amount of carbon (25 wt %) is calculated based on the polymer weight. Entry 6 and 7 demonstrates the addition of lactic acid significantly improves the removal of tin with the same amount of activated carbon. However, using lactic acid only (entry 8 and 9) cannot purify the polymer to less than 1 ppm residual tin.

TABLE 1

Initial combination of activated carbon and lactic acid (LA)

| Entry | Activated carbon amount based on polymer weight | Lactic acid amount Wt % in acetone | Residual Tin (ppm) |
|---|---|---|---|
| 1 | 150 wt % | 0 | 0.21 |
| 2 | 100 wt % | 0 | 0.03 |
| 3 | 50 wt % | 0 | 0.14 |
| 4 | 25 wt % | 0 | 0.08 |
| 5 | 10 wt % | 0 | 1.95 |
| 6 | 25 wt % | 3 wt % | 0.04 |
| 7 | NA | 3 wt % | 24 |
| 8 | NA | 20 wt % | 4.7 |

Example 2: Poly(D,L-Lactide) (RESOMER® Select 100 DL 12A)

D,L-lactide was polymerized in bulk catalyzed by tin 2-ethyl hexanoate and initiated by glycolic acid. The resulting poly(D,L-lactide) with acid end group was characterized to have an average molecular weight ($M_w$) of 186 kDa, $M_w/M_n$ of 1.7 by GPC, and tin content of 89 ppm.

12.5 g poly(D,L-lactide) was dissolved in 250 mL acetone to yield a clear amber solution. A combination of activated carbon and lactic acid was added to remove the residual $Sn^{2+}$ in the polymer. The resulting suspension is stirred for 3 hours, filtered to remove activated carbon, followed by recovery of the purified polymer solid by anti-solvent precipitation with water. Different amounts of activated carbon and lactic acid produced purified polymer with different residual $Sn^{2+}$ contents as shown in Table 2.

The addition of lactic acid boosted the activated carbon tin removal efficiency. The amount of activated carbon can be reduced to as low as 1 wt % when using 3 wt % lactic acid in acetone as shown in Table 2, entry 4. Depending on the amount of lactic acid added in the process, acid may not be fully washed away and impact the polymer acid level. The purification goal is to reduce residual tin level without compromising the other polymer attributes. Therefore, the residual acid level in each polymer was monitored to ensure the polymer quality. As shown in Table 2, entry 5, reducing the lactic acid amount from 3 wt % to 0.6 wt % also reduces the acid number to 1.5 mg KOH/g. This value is very close to the starting polymer acid level (Table 2, entry 1).

Further screening of activated carbon amount effect was performed in a similar fashion. 10.6 g poly(D, L-lactide) is dissolved in acetone to yield a 6-7 wt % clear amber solution. 0.5 g activated carbon (5 wt % of polymer) and 1.1 g lactic acid are added. The resulting suspension was stirred for 3 hours, filtered to remove activated carbon, followed by recovery of the purified polymer solid by anti-solvent precipitation with water. The collected polymer is vacuum dried. The final yield is 9.5 g.

The combination of 5 wt % activated carbon based on polymer and 0.6 wt % lactic acid in acetone is efficient enough to achieve less than 1 ppm tin without increasing the acid number in the purified polymer (Table 2, entry 6).

TABLE 2

Optimization of the activated carbon and lactic acid combination

| Entry | activated carbon amount | LA amount | Residual Tin (ppm) | Acid number (mg KOH/g) | Yield (%) |
|---|---|---|---|---|---|
| 1 | Base | na | 89.0 | 1.2 | na |
| 2 | 8 wt % polymer | 3 wt % acetone | 0.09 | 4.5 | 90-95 |
| 3 | 5 wt % polymer | 3 wt % acetone | 0.18 | 4.3 | 90-95 |
| 4 | 1 wt % polymer | 3 wt % acetone | 0.41 | 4.9 | 90-95 |
| 5 | 8 wt % polymer | 0.6 wt % acetone | 0.04 | 1.5 | 90-95 |
| 6 | 5 wt % polymer | 0.6 wt % acetone | 0.6 | 1.5 | 90-95 |

Example 3 (Thermal Stability)

Polymer thermal stability is an important parameter during the dry formulation processing, e.g. hot melt extrusion. It was reported that moisture, hydrolyzed monomers and oligomers, and residual metals are key factors that influence poly(D,L-lactide) thermal stability (D. Cam et al *Polymer* 38, 1997, 1879-1884). Poly(D,L-lactide) with an IV of 1.2 dL/g is processed via four different methods to give four products with different amounts of residual tin and residual monomer contents. The analytical results of these processed poly(D,L-lactide)s are listed in Table 3. The thermal stability of these polymers was studied by holding them at 230° C. over 2 h under nitrogen protection. Aliquots were taken at different time points and their weight-averaged molecular weights were characterized by GPC, as shown in FIG. 1.

TABLE 3

Analytical data of poly(D,L-lactide)s obtained from different processes

| Entry | Polymer description | Tin (ppm) | Monomer (wt %) | $M_W$ (kDa) |
|---|---|---|---|---|
| 1 | Base | 89 | 2.7 | 203 |
| 2 | Low tin | 1.2 | 2.5 | 212 |
| 3 | Low monomer | 73 | 0.2 | 208 |
| 4 | Low tin and low monomer | 0.05 | 0.3 | 209 |

The base polymer (Table 3, entry 1) had both high tin and high monomer residue. It showed 85% loss of molecular weight after 25 minutes at 230° C. The third polymer (Table 3, entry 3) had high tin but low monomer residue. Its thermal stability was slightly improved compared to Entry 1. The polymer showed only 39% loss of molecular weight after 25 minutes at 230° C. The polymers in Table 3, entries 2 and 4 had low tin residue. They demonstrated superior thermal stability. No significant degradations observed at 230° C. over 1 h and only minor degradation over 2 h. The polymer expected as the product of this invention showed only 17% loss of molecular weight after 2 h.

What is claimed is:
1. A method of reducing the residual tin content in a tin containing resorbable polymer to less than 1 ppm, comprising:
   (a) dissolving a polymer in an organic solvent to produce a polymer solution;

(b) combining the polymer solution with activated carbon and an additive; wherein said method results in the formation of a purified polymer; and (c) recovering the purified polymer by anti-solvent precipitation; and wherein the additive is lactic acid.

2. The method of claim 1, wherein the polymer is linear.

3. The method of claim 2, wherein the additive is up to 20 wt % of the solvent, and activated carbon is up to 9 wt % of the linear polymer.

4. The method of claim 1, wherein the polymer is branched.

5. The method of claim 4, wherein the additive is up to 20 wt % of the solvent, and activated carbon is between 50-100 wt % of the branched polymer.

6. The method of claim 1, wherein the additive and activated carbon is exposed to the polymer solution for 2 to 4 hours.

7. A purified polyester which is a branched or a linear polylactide-glycolide having a weight averaged molecular weight of 5 to 315 kDa, a polydispersity $M_w/M_n$ of 1.5 to 2.5, prepared by the process of ring-opening polymerization of lactide and glycolide in the presence of tin (II)-(2-ethylhexanoate) or tin chloride followed by treatment with activated carbon and an additive; and wherein the additive is lactic acid.

8. The purified polyester of claim 7 having a D,L-lactide/glycolide molar ratio of 100-50/0-50.

9. The purified polyester of claim 7 having a D,L-lactide/caprolactone molar ratio of 100-90/0-10.

10. The purified polyester of claim 7 having a terpolymer of lactide, glycolide, and caprolactone.

11. The purified polyester of claim 7, wherein the purified polyester is poly(D,L-lactide), poly(D,L-lactide-co-glycolide) with more than 50 mole % D,L-lactide content, poly(D,L-lactide-co-caprolactone) with more than 10 mole % D,L-lactide content, poly(L-lactide-co-caprolactone) with more than 50 mole % L-lactide content, poly(D,L-lactide-co-trimethylene carbonate) with more than 50 mole % D,L-lactide content, poly(D,L-lactide-co-dioxanone) with more than 50 mole % D,L-lactide content, or poly(D,L-lactide-co-glycolide-co-caprolactone) with less than 50 mole % glycolide content.

12. The purified polyester of claim 7 having an acid number comparable to standard polylactide.

13. The purified polyester of claim 7 having improved thermal stability compared to standard polylactide.

* * * * *